No. 876,580. PATENTED JAN. 14, 1908.
F. M. NEWLAND.
WEEDER.
APPLICATION FILED AUG. 30, 1906.

2 SHEETS—SHEET 1.

Witnesses
W. S. Rockwill
James W. Quinn

Inventor
F. M. Newland

By Chandler & Chandler
Attorneys

No. 876,580. PATENTED JAN. 14, 1908.
F. M. NEWLAND.
WEEDER.
APPLICATION FILED AUG. 30, 1906.

2 SHEETS—SHEET 2.

Witnesses
W. S. Rockwell
James W. Quinn

Inventor
F. M. Newland
By Chandler & Chandler
Attorneys

UNITED STATES PATENT OFFICE.

FRANCIS M. NEWLAND, OF ALGER, OHIO.

WEEDER.

No. 876,580.      Specification of Letters Patent.      Patented Jan. 14, 1908.

Application filed August 30, 1906. Serial No. 332,677.

*To all whom it may concern:*

Be it known that I, FRANCIS M. NEWLAND, a citizen of the United States, residing at Alger, in the county of Hardin, State of Ohio, have invented certain new and useful Improvements in Weeders; and I do hereby declare the following to be a full, clear, and exact description of the invention, such as will enable others skilled in the art to which it appertains to make and use the same.

This invention has reference to weeders, and has for its object to provide a reversible machine of that nature provided with a revolving drum and with a transversely adjustable knife, either the knife or the drum being thrown into operation according as the machine is in normal or inverted positions.

The invention further consists in the construction, combination, and arrangement of parts, all as hereinafter fully described, specifically claimed, and illustrated in the accompanying drawings, in which—

Figure 1:
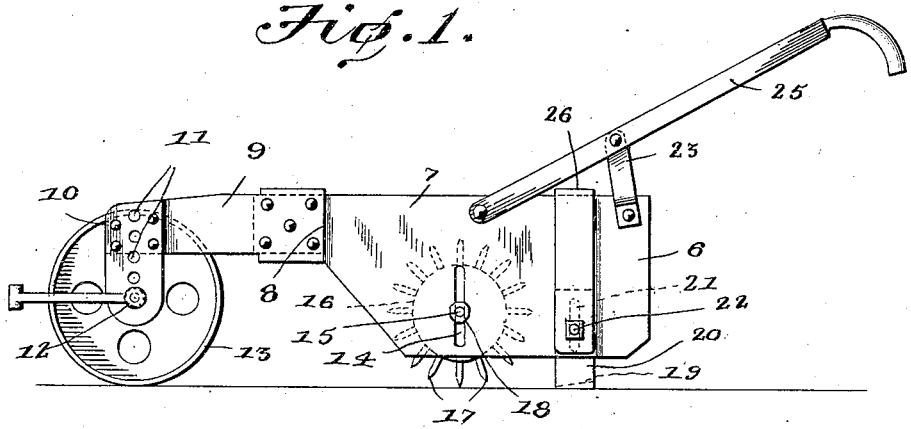
Figure 2:
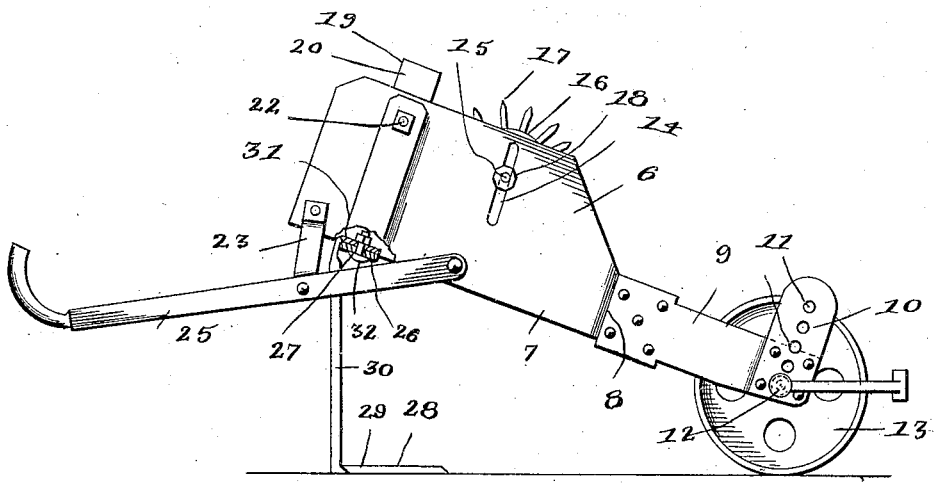
Figure 3:
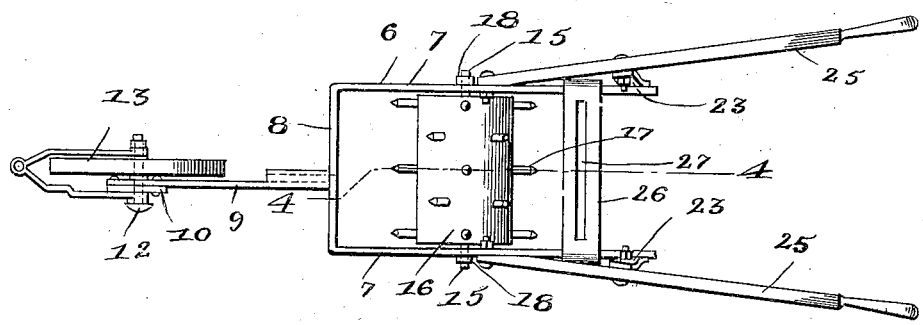
Figure 4:
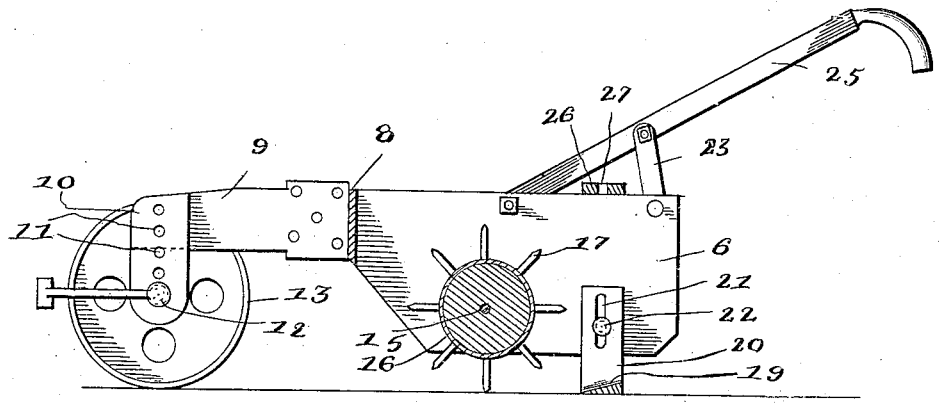

Figure 1 is a side elevation of the machine in its normal position. Fig. 2 is a side elevation of the machine in its inverted position with the stalk-cutting knife in place. Fig. 3 is a top plan view of Fig. 1. Fig. 4 is a longitudinal vertical section taken approximately on the line 4—4 of Fig. 3.

Like parts are designated by corresponding reference numerals in several ways.

The machine is shown in the drawings as comprising a frame 6, having spaced sides 7 and a connecting end 8, provided with a forward extension 9. Said extension has secured thereto a depending strip 10 provided with a series of alining perforations 11, through one of which the pivot-bolt 12 of the centering wheel 13 is passed. The frame sides 7, adjacent their front ends, are slotted longitudinally, as at 14, to receive the projecting trunnions 15 of a rotatable drum 16, comprising a hardwood base and a covering of sheet-steel or iron, provided with spikes 17 arranged in staggered relation. The drum is therefore adjustable vertically within the frame and is held in adjusted position by means of nuts or collars 18 provided on its trunnions. Mounted likewise in the rear end of the machine towards the lower edges of the sides is a transversely-disposed knife 19, the ends 20 of which are bent at right angles thereto and provided with vertical slots 21 to permit a similar adjustment of said knife, the knife being held in position when adjusted by means of bolts 22 passing through openings formed in the sides of the frame and through the slots 21 in the bent knife ends.

Secured to the frame sides in the upper portion thereof and toward the rear of the frame is a pair of brackets 23 provided with openings for the reception of the bolts of the handles 25, said bolts being located intermediate the ends of the handles. The frame is further provided with a transversely-disposed strap 26 which connects the upper edges of the frame sides and has its opposite ends bent downwardly against such sides and secured thereto. This strap serves as a means of attachment to the frame of a stalk-cutting knife 28, which includes a forwardly-extending blade 29 and a vertical standard 30, having its upper end bent at right angles to form a shoulder 31, said shoulder being perforated for the reception of the fastening bolt 32, which passes therethrough, and through a longitudinal slot 27 formed in the strap 26, thus permitting the knife to be adjusted transversely of the frame. It is to be understood, however, that the stalk-cutting knife above described, is operative only when the machine is in its inverted position, in which instance the rotating drum as well as the knife 19 are thrown out of operation, and may be detached from the frame if desired. It will likewise be understood that when the machine is in its normal position, the stalk-cutting knife 28 is detached, and that, if desired, either the drum or the transverse knife 19 may likewise be removed, thus providing the machine with a single operating element only.

While the function of the revolving drum and of the knife 19 are thought to be obvious, it may be stated that the former, owing to the provision of its spikes, serves to tear down and chop the weeds to some extent, while the latter contacts directly with and severs such stalks as escape the action of the spikes, and serves also as a leveler, smoothing the ground torn up by the drum spikes.

The pivot bolt 12 of the centering wheel 13 is provided with means for attaching a whiffle-tree thereto, the said centering wheel being capable of vertical adjustment irrespective of the position of the frame, owing to the provision of the perforated depending strap 10, which is secured to the forward extension 9 of the frame.

What is claimed is—

1. A reversible weeder comprising a frame including spaced sides and a forward connecting end; a forward extension connected to said end portion and disposed longitudinally of the frame; a depending perforated strip secured to the front end of said extension; a centering wheel adjustably secured to said strip; a rotatable, spiked drum mounted in said frame adjacent the lower edge thereof; a transversely disposed knife having its opposite ends slotted and bent upwardly against the corresponding frame sides; bolts secured to said frame sides and engaged in said slots, to permit said knife to be vertically adjusted; a strap connecting the frame sides at their upper edges; a standard having a bent lower end engaged with said strap; a forwardly extending stalk cutting blade disposed at the upper end of said strap; and a pair of handles secured intermediate their ends to said frame sides, for reversing the position of said frame, to throw the drum and transverse knife, and the stalk-cutting blade into operation according as the frame is in normal or inverted position.

2. A reversible weeder comprising a frame including spaced sides and a forward connecting end; a forward extension connected to said end portion and disposed longitudinally of the frame; a depending perforated strip secured to the front end of said extension; a centering wheel adjustably secured to said strip; a rotatable, spiked drum mounted in said frame adjacent the lower edge thereof; a transversely disposed knife having its opposite ends slotted and bent upwardly against the corresponding frame sides; and bolts secured to said frame sides and engaged in said slots, to permit said knife to be vertically adjusted.

3. A weeder comprising a frame including spaced sides; a centering wheel secured to said frame; a rotating drum mounted in the lower portion of said frame; a strap connecting the frame sides at their upper edges and provided with a longitudinal slot; a knife projecting upwardly and having a shoulder provided with a bolt for sliding engagement in said slot; brackets secured to the frame sides; and handles secured intermediate their ends to said brackets, whereby the frame may be reversed, and either the drum or the knife thrown into operation.

In testimony whereof, I affix my signature in presence of two witnesses.

FRANCIS M. NEWLAND.

Witnesses:
 ELZA HARVY,
 W. A. CAMPBELL.